United States Patent
Lee et al.

(10) Patent No.: US 12,361,672 B2
(45) Date of Patent: Jul. 15, 2025

(54) METHOD FOR SELF-SUPERVISED REINFORCEMENT LEARNING BY ANALOGY-MAKING CROSS-REFERENCE TO RELATED APPLICATION

(71) Applicant: Korea Advanced Institute of Science and Technology, Daejeon (KR)

(72) Inventors: Sang Wan Lee, Daejeon (KR); Shin Young Joo, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 357 days.

(21) Appl. No.: 17/901,148

(22) Filed: Sep. 1, 2022

(65) Prior Publication Data
US 2023/0215133 A1 Jul. 6, 2023

(30) Foreign Application Priority Data
Jan. 6, 2022 (KR) .................. 10-2022-0001866

(51) Int. Cl.
*G06N 3/092* (2023.01)
*G06N 3/045* (2023.01)
*G06N 5/04* (2023.01)
*G06V 10/70* (2022.01)

(52) U.S. Cl.
CPC ............. *G06V 10/70* (2022.01); *G06N 3/045* (2023.01)

(58) Field of Classification Search
CPC ...... G06V 10/70; G06V 10/454; G06V 10/82; G06N 3/045; G06N 3/0475; G06N 3/0895; G06N 3/094; G06N 3/092; G06N 5/04; G06N 3/08; G06N 20/00
See application file for complete search history.

(56) References Cited

U.S. PATENT DOCUMENTS

| | | | |
|---|---|---|---|
| 2020/0285964 A1* | 9/2020 | Cao .................. | G06N 3/047 |
| 2021/0150698 A1* | 5/2021 | Chu .................. | G06N 3/045 |
| 2021/0264234 A1* | 8/2021 | Paris ................. | G06N 3/048 |
| 2022/0147876 A1* | 5/2022 | Dalli ................. | G06N 20/00 |
| 2022/0222529 A1* | 7/2022 | Wang ................ | G06N 3/045 |
| 2022/0292335 A1* | 9/2022 | Ren .................. | G06N 3/045 |
| 2022/0351073 A1* | 11/2022 | Wu .................. | G06N 3/006 |

FOREIGN PATENT DOCUMENTS

JP 2019-8499 6/2001

OTHER PUBLICATIONS

Kahn et al. "Self-supervised Deep Reinforcement Learning with Generalized Computation Graphs for Robot Navigation," (2008) 2018 IEEE International Conference on Robotics and Automation (ICRA) (Year: 2018).*

Kahn et al., "Self-supervised Deep Reinforcement Learning with Generalized Computation Graphs for Robot Navigation," (2008) 2018 IEEE International Conference on Robotics and Automation (ICRA).

* cited by examiner

*Primary Examiner* — Amandeep Saini
*Assistant Examiner* — Emma Rose Goebel
(74) *Attorney, Agent, or Firm* — Christensen O'Connor Johnson Kindness PLLC

(57) ABSTRACT

Disclosed is a method for self-supervised reinforcement learning (RL) by analogy executed by a computer device, the method including configuring a self-supervised RL with analogical reasoning (SRAR) model; and learning a policy for problem solving in a situation in which a task domain changes using the configured SRAR model.

18 Claims, 11 Drawing Sheets

$\mathcal{M}_{Fruitbot}$

Train MDP​ Test MDP​ Test MDP $\mathcal{M}_{Jumper}$

Train MDP​ Test MDP​ Test MDP $\mathcal{M}_{Climber}$

Train MDP​ Test MDP​ Test MDP

METHOD FOR SELF-SUPERVISED REINFORCEMENT LEARNING BY ANALOGY-MAKING

CROSS-REFERENCE TO RELATED APPLICATION

This application claims the priority benefit of Korean Patent Application No. 10-2022-0001866, filed on Jan. 6, 2022, in the Korean Intellectual Property Office, the disclosure of which is incorporated herein by reference in its entirety.

BACKGROUND

1. Field of the Invention

The following description of example embodiments relates to technology for self-supervised learning.

2. Description of the Related Art

Current deep reinforcement learning (RL) algorithms trained based on high-dimensional input data may be applicable to various fields in that it is possible to find a problem solving policy in a real situation, but may have limitations in generalization or actual scalability due to overfitting. In particular, they are vulnerable to a background domain change irrelevant to policy learning and often fail to adapt to a small semantic change.

To solve the aforementioned issue, technology using a large amount of both online and offline learning data is developed, but there is a fundamental limitation in that large cost is used to acquire data. Also, as an alternative, a regularization technique or data augmentation technology widely used for typical supervised learning is being studied. However, corresponding methods refer to a method that manually uses a predefined transformation and may have a greatly degraded scalability and have unavoidable limitations in contextual situations in which defined transformation has a meaning.

SUMMARY

Example embodiments may provide a method and apparatus for self-supervised reinforcement learning (RL) that is inspired by human analogy-making and thereby allows an RL agent to learn generalizable latent features.

Example embodiments may provide a method and apparatus that may decompose each original image into a task domain code and an action code, may generate a virtual hybrid image by combining the task domain code with a different action code, and may maximize mutual information (MI) between the generated hybrid image and labels of original images.

According to an aspect, there is provided a method for self-supervised reinforcement learning (RL) by analogy executed by a computer device, the method including configuring a self-supervised RL with analogical reasoning (SRAR) model; and learning a policy for problem solving in a situation in which a task domain changes using the configured SRAR model.

The SRAR model may be trained such that a reinforcement learning (RL) agent performing an analogy-making procedure when adopting an action for problem solving achieves an objective of the policy.

The SRAR model may be configured to perform analogy-making through a mutual information (MI) regularized generative adversarial network (GAN) structure.

The SRAR model may be configured to generate a hybrid image by training an encoder, a generator, and a discriminator, and simultaneously to maintain MI between the hybrid image and labels of original images.

The learning may include inputting each original image to a convolution-based encoder, and separating a task domain code and an action code from the each original image through the convolution-based encoder.

The learning may include inputting a task domain code of one original image and an action code of another original image based on the task domain code and the action code separated from the each original image to a generator, and generating a combined hybrid image through the generator.

The learning may include evaluating a realistic level of the generated hybrid image by comparing the generated hybrid image and an original image that refers to the task domain code through a discriminator.

The learning may include inputting the generated hybrid image to each of a basic discriminator, a style discriminator, and an action predictor.

The basic discriminator may be configured to help a realistic image generation in the hybrid image.

The style discriminator may be configured to output a realistic level of a task domain-relevant style by comparing the generated hybrid image and the original image that refers to the task domain code.

The action predictor may be configured to output an action distribution given to the generated hybrid image, and to minimize a Kullback-Leibler (KL) divergence between the output action distribution and an original action distribution of the original image that refers to the action code.

The RL agent may be configured to learn a generalizable policy using task domain-invariant action code.

The learning may include learning the policy using a proximal policy optimization (PPO) algorithm to the hybrid image for training the RL agent.

According to another aspect, there is provided a non-transitory computer-readable recording medium storing instructions that, when executed by a processor, cause the processor to perform the method for self-supervised RL by analogy.

According to still another aspect, there is provided a computer device including a model constructor configured to configure a SRAR model; and a policy learner configured to learn a policy for problem solving in a situation in which a task domain changes using the configured SRAR model.

According to some example embodiments, it is possible to improve a generalization probability of a learned RL policy by effectively extracting task domain-irrelevant action information through self-supervised RL with analogical reasoning.

According to some example embodiments, it is possible to maximize MI between inputs of task domains that share the same action code.

According to some example embodiments, it is possible to learn task domain-invariant action features by separately learning representations for a task domain.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, example embodiments will be described with reference to the accompanying drawings.

Figure 1:
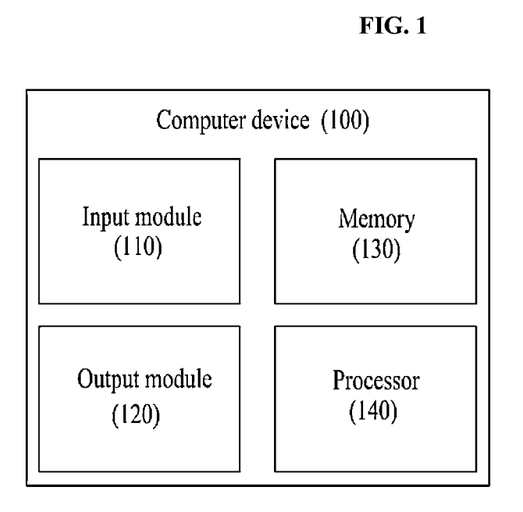
FIG. 1 is a diagram illustrating a configuration of a computer device according to an example embodiment.

FIG. 1 is a diagram illustrating a configuration of a computer device according to an example embodiment.

Referring to FIG. 1, a computer device 100 may include at least one of an input module 110, an output module 120, a memory 130, and a processor 140. In some example embodiments, at least one component among components of the computer device 100 may be omitted and at least one another component may be added. In some example embodiments, at least two components among the components of the computer device 100 may be implemented as a single integrated circuitry.

The input module 110 may input a signal to be used to at least one component of the computer device 100. The input module 110 may include at least one of an input device configured for a user to directly input a signal to the computer device 100, a sensor device configured to generate a signal by sensing a change in a surrounding environment, and a reception device configured to receive a signal from an external device. For example, the input device may include at least one of a microphone, a mouse, and a keyboard. In some example embodiments, the input device may include at least one of a touch circuitry set to sense a touch and a sensor circuitry set to measure intensity of force generated by the touch. Here, the input module 110 may include a PPG sensor.

The output module 120 may output information to an outside of the computer device 100. The output module 120 may include at least one of a display device configured to visually output information, an audio output device configured to output information using an audio signal, and a transmission device configured to wirelessly transmit information. For example, the display device may include at least one of a display, a hologram device, and a projector. For example, the display device may be implemented as a touchscreen through assembly to at least one of the touch circuitry and the sensor circuitry of the input module 110. For example, the audio output device may include at least one of a speaker and a receiver.

According to some example embodiments, the reception device and the transmission device may be implemented as a communication module. The communication module may communicate with an external device in the computer device 100. The communication module may establish a communication channel between the computer device 100 and the external device and may communicate with the external device through the communication channel. Here, the external device may include at least one of a vehicle, a satellite, a base station, a server, and another computer system. The communication module may include at least one of a wired communication module and a wireless communication module. The wired communication module may connect to the external device in a wired manner and may communicate with the external device in the wired manner. The wireless communication module may include at least one of a near field communication module and a far field communication module. The near field communication module may communicate with the external device using a near field communication method. For example, the near field communication method may include at least one of Bluetooth, wireless fidelity (WiFi) direct, and infrared data association (IrDA). The far field communication module may communicate with the external device using a far field communication method. Here, the far field communication module may communicate with the external device over a network. For example, the network may include at least one of a cellular network, the Internet, and a computer network such as a local area network (LAN) and a wide area network (WAN).

The memory 130 may store a variety of data used by at least one component of the computer device 100. For example, the memory 130 may include at least one of a volatile memory and a non-volatile memory. Data may include at least one program and input data or output data related thereto. The program may be stored in the memory 130 as software including at least one instruction and may include, for example, at least one of an OS, middleware, and an application.

The processor 140 may control at least one component of the computer device 100 by executing a program of the memory 130. Through this, the processor 140 may perform data processing or operation. Here, the processor 140 may execute an instruction stored in the memory 130.

According to various example embodiments, the processor 140 may be configured to learn a policy for problem solving in a situation in which a task domain changes using a self-supervised reinforcement learning (RL) with analogical reasoning (SRAR) model. Description of such processor is made with reference to FIGS. 2 and 3.

Figure 2:
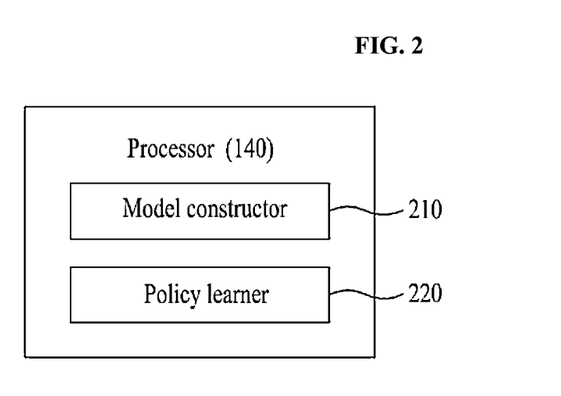
FIG. 2 is a diagram illustrating a configuration of a processor according to an example embodiment.
Figure 3:
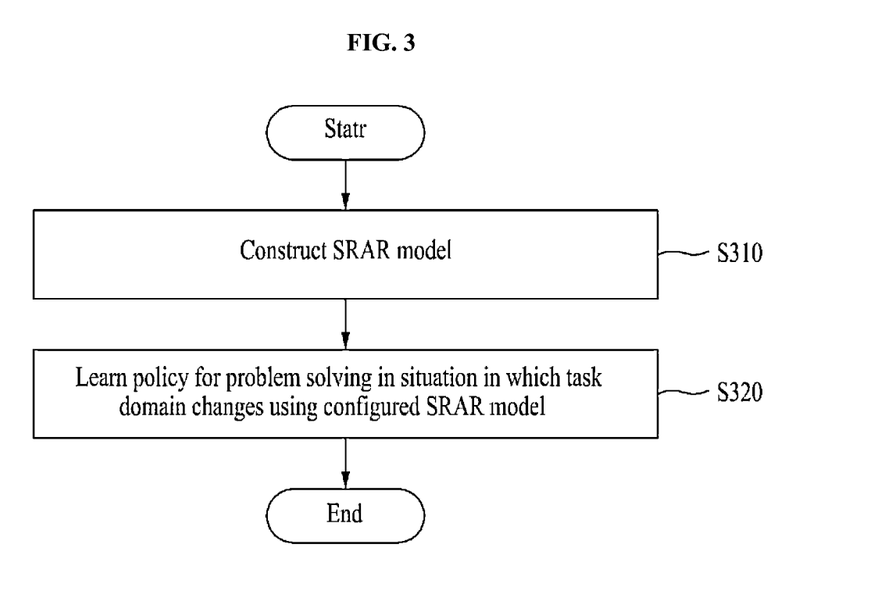
FIG. 3 is a flowchart illustrating a method for self-supervised reinforcement learning (RL) by analogy according to an example embodiment.

FIG. 2 is a diagram illustrating a configuration of a processor according to an example embodiment, and FIG. 3 is a flowchart illustrating a method for self-supervised reinforcement learning (RL) by analogy according to an example embodiment.

The processor 140 of the computer device 100 may include a model constructor 210 and a policy learner 220. Such components of the processor 140 may be representations of different functions performed by the processor 140 in response to a control instruction provided from a program code stored in the computer device 100. The processor 140 and the components of the processor 140 may control the computer device 100 to perform operations 310 and 320 included in the self-supervised RL method by analogy. Here, the processor 140 and the components of the processor 140 may be implemented to execute an instruction according to a code of at least one program and a code of an OS included in the memory 130.

The processor 140 may load, to the memory 130, a program code stored in a file of a program for the self-supervised RL method by analogy. For example, in response to execution of the program in the computer device 100, the processor 140 may control the computer device 100 to load the program code from the file of the program to the memory 130 under control of an OS. Here, the model constructor 210 and the policy learner 220 may be different functional representations of the processor 140 to implement the following operations 310 and 320 by executing an instruction of a corresponding portion in the program code loaded to the memory 130.

In operation 310, the model constructor 210 may construct a self-supervised RL with analogical reasoning (SRAR) model. Here, the SRAR model may be trained such that an RL agent performing an analogy-making procedure when adopting an action for problem solving achieves an objective of the policy. The SRAR model may be configured to perform analogy-making through a mutual information (MI) regularized generative adversarial network (GAN) structure. The SRAR model may be configured to generate a hybrid image by training an encoder, a generator, and a discriminator, and simultaneously to maintain MI between the hybrid image and labels of original images.

In operation 320, the policy learner 220 may learn a policy for problem solving in a situation in which a task domain changes using the configured SRAR model. The policy learner 220 may input each original image to a convolution-based encoder, and may separate a task domain code and an action code from the each original image through the convolution-based encoder. The policy learner 220 may input a task domain code of one original image and an action code of another original image based on the task domain code and the action code separated from the each original image to a generator, and may generate a combined hybrid image through the generator. The policy learner 220 may evaluate a realistic level of the generated hybrid image by comparing the generated hybrid image and an original image that refers to the task domain code through a discriminator. In detail, the policy learner 220 may input the generated hybrid image to each of a basic discriminator, a style discriminator, and an action predictor. Here, the basic discriminator may help a realistic image generation in the hybrid image, the style discriminator may output a realistic level of a task domain-relevant style by comparing the generated hybrid image and the original image that refers to the task domain code, and the action predictor may output an action distribution given to the generated hybrid image, and may minimize a Kullback-Leibler (KL) divergence between the output action distribution and an original action distribution of an original image that refers to the action code. The policy learner 220 may learn the policy using a proximal policy optimization (PPO) algorithm for the hybrid image to train the RL agent.

Figure 5:
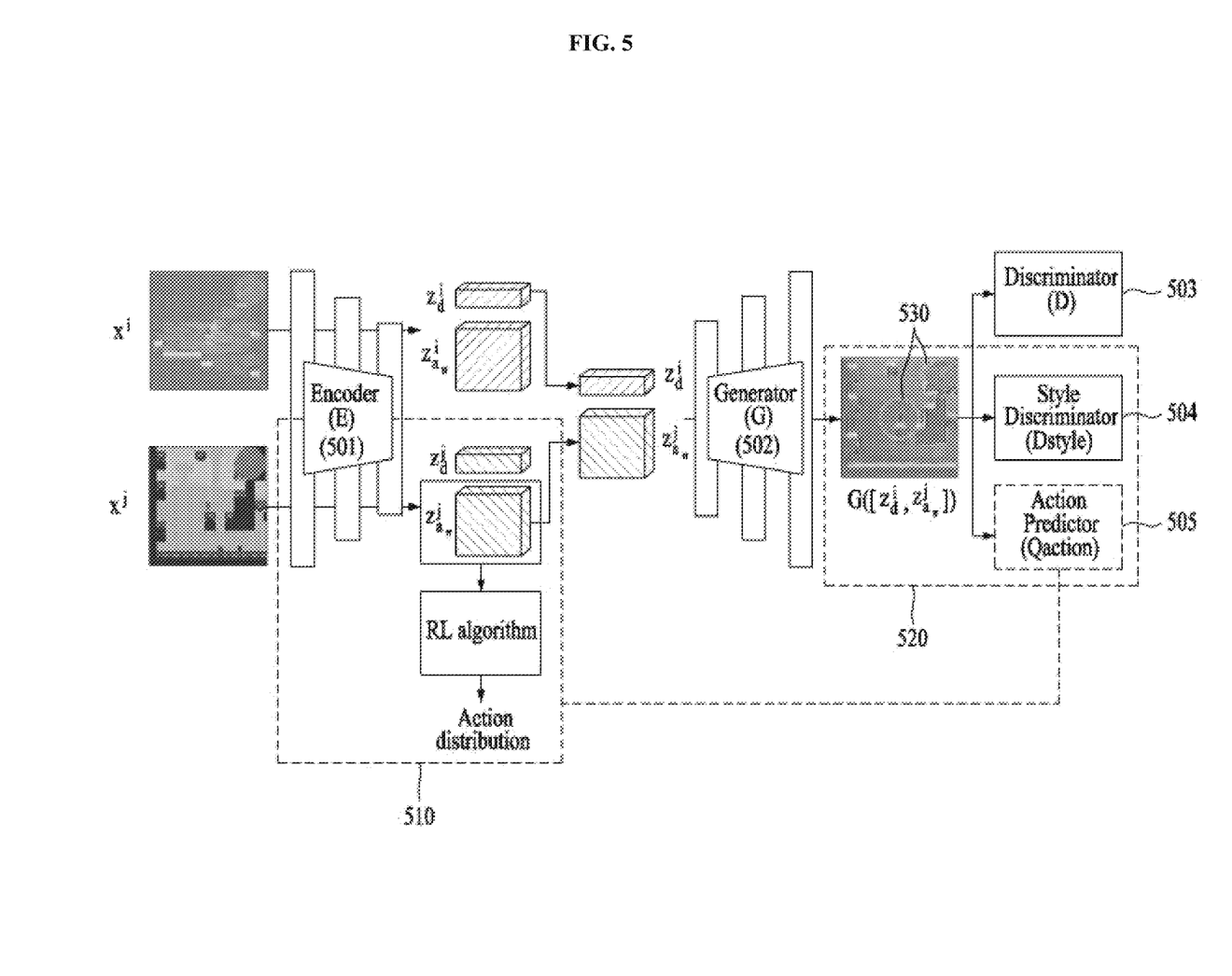
FIG. 5 illustrates an example of a self-supervised RL operation by analogy according to an example embodiment.

FIG. 5 illustrates an example of a self-supervised RL operation by analogy according to an example embodiment.

In an example embodiment, problem formulation may be performed as follows to explain the self-supervised RL operation by analogy.

Used is a Markov decision process (MDP) setting in which MDP is denoted as $\mathcal{M}=(\mathcal{X}, \mathcal{A}, \mathcal{R}, \mathcal{P}, \gamma)$ with a state space $\mathcal{X}$, an action space $\mathcal{A}$, a reward function $\mathcal{R}$, transition dynamics $\mathcal{P}$, and discount factor $\gamma \in [0,1)$.

A policy $\pi(\cdot|x)$ represents a probability distribution over actions given state x. A basic goal of RL is to learn an optimal policy that maximizes expected cumulative discounted regards $E_{a_t \sim \pi(\cdot|x_t)}[\Sigma_t \gamma^t R(x_t, a_t)]$ starting from an initial state $x_0$. The goal of generalizable RL is to find the core action context so that the learned policy is robust to task-domain changes.

To formulize this, considered is a distribution of tasks, each defined as an MDP, $\mathcal{M}^i \in \mathcal{M}$ in which $i \in I$ and $|I|$ defines a size of a task distribution. Such MDPs share the action space $\mathcal{A}$, the reward function R, and the transition dynamics P but are with disjoint state spaces $\mathcal{X}^i \cap \mathcal{X}^j = \emptyset$. For example, different MDPs correspond to different task levels in the same environment in the OpenAI ProcGen benchmark suite (see FIG. 4). A union state space $\mathcal{S}$ of all possible spaces in which $\mathcal{S} = \cup_{i \in I} \mathcal{X}^i$ is defined. It is assumed that an RL agent may access a collection of training MDPs $\{\mathcal{M}^i\}_{i=1}^N$ and an index i of each. After training, the RL agent applies its policy $\pi$ over the entire state space S including unseen MDPs. The learned policy's zero-shot performance without any meta-learning phase is evaluated.

Hereinafter, a goal of a broadly generalizable policy is described. Intuitively, an agent needs to use as compact state representations as possible to determine an optimal action in a given state. From this intuition, a key generative factor of state space is defined and the goal of the broadly generalizable policy is formalized. The formulation uses the notion of entropy H and mutual information (MI) $\mathcal{I}$.

Definition 1 (key generative factors of state space). Here, d denotes labels of all features irrelevant to an action choice, but relevant to state space $\mathcal{X}^i$ of the task $\mathcal{M}^i$. For any $x \in \mathcal{X}^i$, Equation 1 may be defined.

$$H(x)=\mathcal{I}(a_\pi,x)+H(x|a_\pi)=\mathcal{I}(a_\pi,x)+J(d,x)=H(z_{a_\pi}^*)+H(z_d^*)$$

Equation 1:

In Equation 1, $[z_{a_\pi}^*, z_d^*]$ denotes an output of an encoder E* that encodes information of x relevant to $a_\pi$ and d, respectively, and $z_{a_\pi}^*$, and $z_d^*$, respectively. Also, an ideal generator G* that generates x in $G([z_{a_\pi}^*, z_d^*]) \in \mathcal{X}^i$ may be defined. Also, $z_{a_\pi}^*$, and $z_d^*$ may be key generative factors of the state space $\mathcal{X}^i$.

Definition 2 (Broadly generalizable policy). $[z_{a_\pi}^*, z_d^*]$ denote key generative factors of the state space $\mathcal{X}^i$.

A goal of learning representations for the broadly generalizable policy is to make a policy built upon a representation z become robust against a task-irrelevant change of $z_d^*$, by maximizing $\mathcal{I}(a_\pi, z)$ while minimizing $\mathcal{I}(d, z)$. An optimal solution of z is $z_{a_\pi}^*$. In an example embodiment, the RL agent that generates a virtual output with different combinations of generative factors of inputs and performs an analogy-making procedure when adopting an optimal action may achieve the objective of the broadly generalizable policy by adding an analogy-making module.

Self-supervised analogy is described. An analogy-making process may be implemented with a mutual information (MI) regularized generative adversarial network (GAN) structure. In additional to an original GAN objective aimed at generating an image as realistic as possible, an encoder E, a generator G, and a discriminator D may be trained to maintain a large amount of MI between hybrid images $G([z_d^i, z_{a_\pi}^j])$ and original labels (task domain label $d^i$ and action label $a_\pi^j$).

The MI regularized GAN objective is as follows. For any $x^i \sim \mathcal{X}^i$ and $x^j \sim \mathcal{X}^i$, Equation 2 may be defined.

$$\min_{E,G} \max_D V_{\mathcal{J}}(D, G, E) =$$
$$V(D, G, E) - \lambda_1 \mathcal{J}\left(d^i, G([z_d^i, z_{a_\pi}^j])\right) - \lambda_2 \mathcal{J}\left(a_\pi^j, G[z_d^i, z_{a_\pi}^j]\right)$$

Equation 2

In Equation 2, $[z_d^i, z_{a_\pi}^i] = E(x^i)$, $[z_d^j, z_{a_\pi}^j] = E(x^j)$, $V(D,G,E)$ denotes a version in which the encoder E is added to an original GAN loss function, which is $E_{x \sim P_{data}}[\log D(x)] + E_{x \sim P_{data}}[\log(1 - D(G(E(x))))]$.

An encoder part of the above objective corresponds to a first stage of human analogy-making, that is, a stage of decomposing an original observation into an action-relevant part and others. A first MI term, $\mathcal{J}(d^i, G([z_d^i, z_{a_\pi}^j]))$, corresponds to a second stage, that is, a stage of imaging a new situation by maintaining context for an action-irreverent part and by replacing an action-relevant part with previous experience. A second MI term, $\mathcal{J}(a_\pi^j, G([z_d^i, z_{a_\pi}^j]))$, corresponds to the last stage of adopting an action using a previously learned policy. It is assumed that the herein proposed model enables the RL agent to achieve the broadly generalizable policy by mimicking a human analogy-making process.

This analogy-making module may achieve the objective of RL. It is assumed that a new image (a hybrid image) is generated using an action code of an image $x^i$ and a task domain code of another image $x^j$. By maximizing MI between the image generated for $z_{a_\pi}$ and a task domain label from which the task domain code is acquired, and between $\mathcal{J}(d^i, G([z_d^i, z_{a_\pi}^j]))$ and a task label $\mathcal{J}(a_\pi^j, G([z_d^i, z_{a_\pi}^j]))$ from which the action code is acquired, and an optimal solution $z_{a_\pi}^*$, may be found by maximizing a lower bound of $\mathcal{J}(a_\pi, z_{a_\pi})$ while minimizing $\mathcal{J}(d, z_{a_\pi})$ (Theorem 1).

Theorem 1. A problem of maximizing MI between the hybrid image and existing labels of codes used for image generation, $\mathcal{J}(d^i, G([z_d^i, z_{a_\pi}^j])) + \mathcal{J}(a_\pi^j, G([z_d^i, z_{a_\pi}^j]))$, is equivalent to a problem of maximizing the lower bound of $\mathcal{J}(a_\pi, z_{a_\pi})$ while minimizing $\mathcal{J}(d, z_{a_\pi})$. The lower bound is tight when $z_{a_\pi}$ and $z_d$ are mutually independent.

It may be provided as follows:

$$\mathcal{J}(d^i, G[z_d^i, z_{a_\pi}^j]) + \mathcal{J}(a_\pi^j, G([z_d^i, z_{a_\pi}^j])) =$$
$$\mathcal{J}(d^i, [z_d^i, z_{a_\pi}^j]) + \mathcal{J}(a_\pi^j, [z_d^i, z_{a_\pi}^j]) \leq$$
$$\mathcal{J}(d^i, z_d^i) + \mathcal{J}(d^i, z_{a_\pi}^j) + \mathcal{J}(a_\pi^j, z_d^i) + \mathcal{J}(a_\pi^j, z_{a_\pi}^j) = \mathcal{J}(d^i, z_d^i) + \mathcal{J}(a_\pi^j, z_{a_\pi}^j) =$$
$$\mathcal{J}(d, z_d) + \mathcal{J}(a_\pi, z_{a_\pi}) = H(z_d^i) + \mathcal{J}(a_\pi, z_{a_\pi}) = H(z_d^i) + H(z_{a_\pi}) - \mathcal{J}(d, z_{a_\pi}).$$

A first equality holds due to $H(X) = H(f(X))$ for any bijective function f (invariance under relabeling). A second equality uses $H(X_1, \ldots, X_n) = \Sigma_{i=1}^n H(X_i|X^{i-1}) \leq \Sigma_{i=1}^n H(X_i)$ (a full chain rule) with equality if $X_1, \ldots, X_n$ are mutually independent. A third equality holds since $\mathcal{J}(d^i, z_{a_\pi}^j) = 0$ and $\mathcal{J}(a_\pi^j, z_d^i) = 0$ when $i \neq j$. A last equality uses the definition of d and $H(x|a_\pi) = \mathcal{J}(d, x)$.

The above theorem indicates that maximizing $\mathcal{J}(d^i, G([z_d^i, z_{a_\pi}^j])) + \mathcal{J}(a_\pi^j, G([z_d^i, z_{a_\pi}^j]))$, for $z_{a_\pi}$ may be simplified with maximizing $\mathcal{J}(a_\pi, z_{a_\pi})$, which also guarantees minimization of $\mathcal{J}(d, z_{a_\pi})$. In addition, the above two problems are equivalent when $z_{a_\pi}$ and $z_d$ are mutually independent. Therefore, the broadly generalizable policy may be achieved by maximizing the MI $\mathcal{J}(d^i, G([z_d^i, z_{a_\pi}^j])) + \mathcal{J}(a_\pi^j, G([z_d^i, z_{a_\pi}^j]))$ and making $z_{a_\pi}$ and $z_d$ be mutually independent.

However, it is impossible to directly calculate the MI term $\mathcal{J}(c|x)$ since posterior $P(c|x)$ is required. To prevent this issue, a variational lower bound of the MI term is used by replacing $P(c|x)$ with an accessible distribution $Q(c|x)$. Accordingly, an original objective may be reconstructed as a problem of minimizing a simple classification loss (see corollary 1).

Corollary 1. Let c be any label for the generated image x. MI between the label c and the generated image x, $\mathcal{J}(c, G([z_d^i, z_a^j]))$, may be maximized by minimizing a classification loss of an auxiliary classifier $Q(c|x;\theta)$.

Hereinafter, a structure of an SRAR model is described with reference to FIG. 5. All the construction factors may be commonly learned during an RL policy learning process.

An image may be generated through disentangled features. Given an input pair $(x^i, x^j) \sim (\mathcal{X}^i, \mathcal{X}^i)$, each input may be applied to the encoder 501 (E). Then, the encoder 501 (E) may output a task domain code and an action code for each input, $E(x^i) = [z_d^i, z_{a_\pi}^i]$ and $E(x^j) = [z_d^j, z_{a_\pi}^j]$, respectively. A general pair $[z_d^i, z_{a_\pi}^i]$ and a swap pair $[z_d^i, z_{a_\pi}^j]$ may be applied to the generator 502 (G). Each pair may be input to a basic discriminator 503 (D) that evaluates a realistic level of the generated image. Also, the encoder 501, the generator 502, and a decoder (503, 504, 505) are trained to generate a realistic image while learning independent features that may be combined to generate a new hybrid image. A loss may be calculated as follows using a non-saturating adversarial loss function.

$$J_{GAN,swap}(E,G,D) = E_{x^i \sim x^i, x^j \sim x^j, x^i \neq x^j}[-\log(D(G([z_d^i, z_{a_\pi}^j])))].$$

Equation 4:

Basic structures of the encoder 501 and the generator 502 are from Swap AutoEncoder except that style and structural feature are replaced by a task domain code and an action code, respectively. For Swap AutoEncoder, it refers to non-patent document 1 (Taesung Park, Jun-Yan Zhu, Oliver Wang, Jingwan Lu, Eli Shechtman, Alexei A Efros, and Richard Zhang. Swapping autoencoder for deep image manipulation. In 34th Conference on Neural Information Processing Systems, 2020).

Hereinafter, an analogy-making operation is described. A second dotted box 520 of FIG. 5 makes a prediction about a hybrid image (a virtual image) and uses labels of original images for prediction loss. This is a core component of the hypothetical analogy-making process. The generated image $G([z_d^i, z_{a_\pi}^j])$ may be provided to three modules including the basic discriminator 503 D, the style discriminator 504 $D_{style}$, and the action predictor 505 $Q_{action}$. The basic discriminator 503 D helps realistic image generation using Equation 5. The style discriminator 504 $D_{style}$ outputs a realistic level by comparing between the given generated image and a style reference image $x^i$ (a style code of the generated image is from $x^i$). The loss is given as follows.

$$J_{style}(E,G,D_{style}) = E_{x^i \sim x^i, x^j \sim x^j}[-\log(D_{style}(\mathrm{crop}(G([z_d^i, z_{a_\pi}^j]))), \mathrm{crops}(x^i)))].$$

Equation 5:

In Equation 5, crop randomly selects a fixed-sized patch of a full image and crops denotes a collection of multiple patches. Also, the action predictor 505 $Q_{action}$ outputs an action distribution given to the hybrid image and minimizes Kullback-Leibler (KL) convergence between the output distribution and an original action distribution of an action reference image $x^j$ (an action code of the generated image is from $x^j$). The action predictor 505 $Q_{action}$ belongs to an RL agent, for example, a first dotted box 510. The loss is given as follows.

$$J_{action}(E,G,Q_{action})=E_{x^i,x^i,x^i,x^j}[D_{KL}(Q_{action}(G([z_d^i, z_{a_\pi}^j]))\|Q_{action}(x^j))]. \quad \text{Equation 6:}$$

Using the above losses, the encoder 501 and the generator 502 learn to generate a hybrid image including an original task domain of $x^i$ and an action context of $x^j$. The action context of $x^j$ may be highlighted with dotted circles 530.

Hereinafter, policy learning is described. The RL agent builds a policy with the action code $z_{a_\pi}$. Also, the RL agent may use the hybrid image to facilitate learning of domain-invariant action features. To train the RL agent, a proximal policy optimization (PPO) algorithm is used. However, any model-free RL algorithm may be used in this proposed framework. The PPO algorithm utilizes action-advantages $A^\pi(a_t,s_t)=Q^\pi(a_t,s_t)-V^\pi(s_t)$ and minimizes a clipped probability loss as follows.

$$L_\pi(\theta)=-E_{\tau\sim\pi}[\min(\rho_t(\theta)A_t,\text{clip}(\rho_t(\theta),1-\epsilon,1+\epsilon)A_t)]. \quad \text{Equation 7:}$$

The hybrid image may be used to calculate a clipped-ratio over the recent experience collected with $\pi_{\theta_{old}}$, as follows.

$$\rho_t(\theta) = \frac{\pi_\theta(a_t|z_t^i) + \lambda_{hybrid}\pi_\theta(a_t|z_t^{i+j})}{\pi_{\theta_{old}}(a_t|z_t^i) + \lambda_{hybrid}\pi_{\theta_{old}}(a_t|z_t^{i+j})}, \quad \text{Equation 8}$$

In Equation 8, $z^j=z_{a_\pi}^j, z^i=z_{a_\pi}^i, z^{i+j}=z_{a_\pi}^{i+j}[z_d^{i+j},z_{a_\pi}^{i+j}]:=E(G([z_d^i,z_{a_\pi}^{j}]))$, and $\lambda_{hybrid}\in(0,1]$. A PPO agent learns a state value estimator $V_\phi(s)$ by minimizing a difference with a target discounted reward using a generalized advantage estimation. Therefore, the loss function is given as follows.

$$L_V(\phi)=E_{\tau\sim\pi}[(V_\phi(z_t^i)-V_t^{targ})^2+\lambda_{hybrid}(V_\phi(z_t^{i+j})-V_t^{targ})^2]. \quad \text{Equation 9:}$$

Figure 6A:
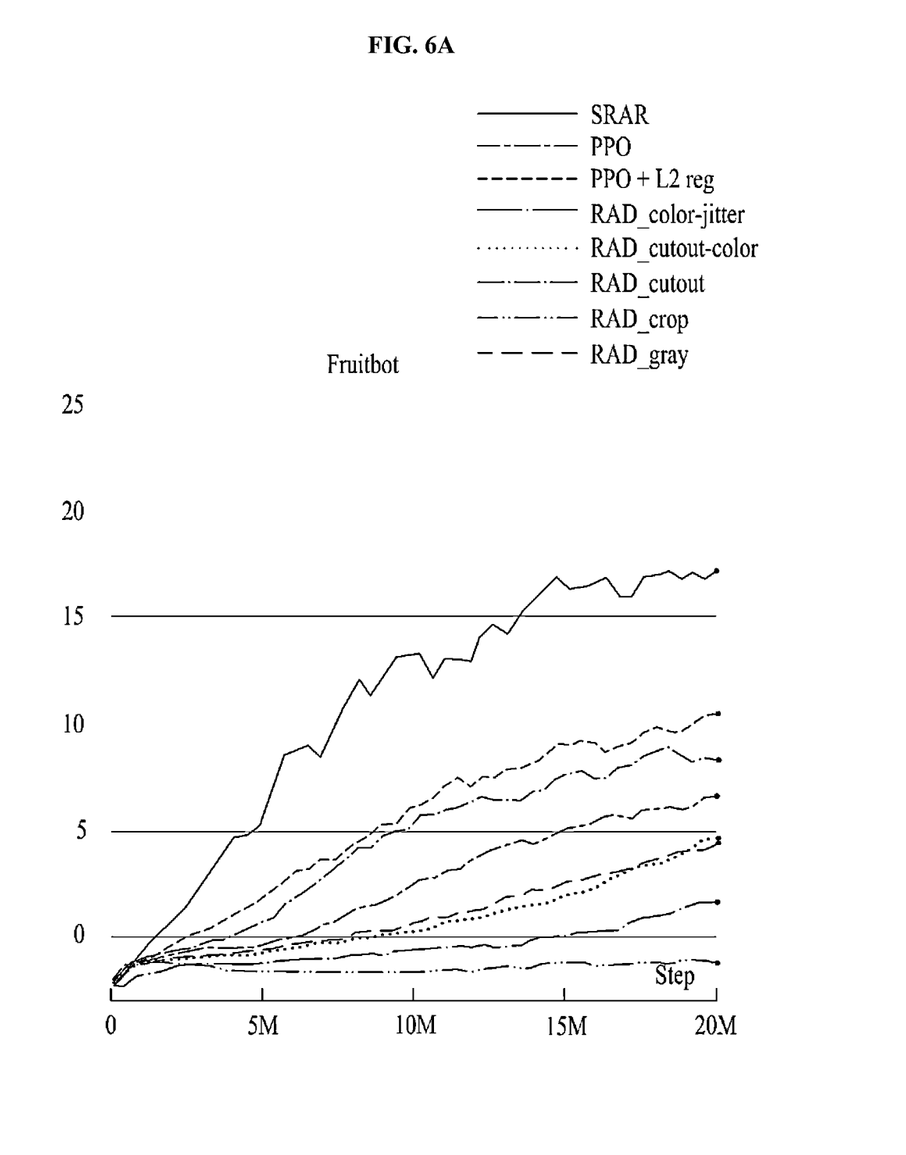
FIG. 6A illustrates an example of performance of a self-supervised RL with analogical reasoning (SRAR) model according to an example embodiment.
Figure 6B:
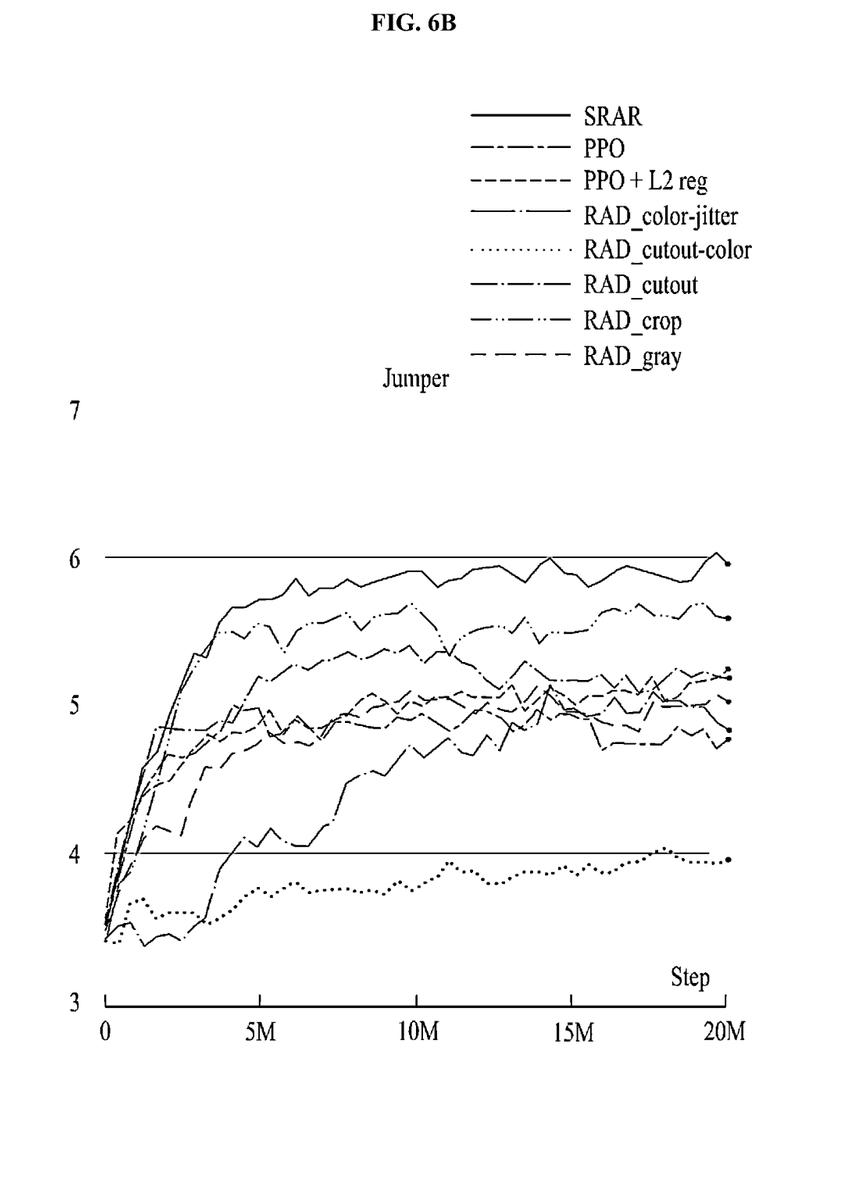
FIG. 6B illustrates an example of performance of a self-supervised RL with analogical reasoning (SRAR) model according to an example embodiment.
Figure 6C:
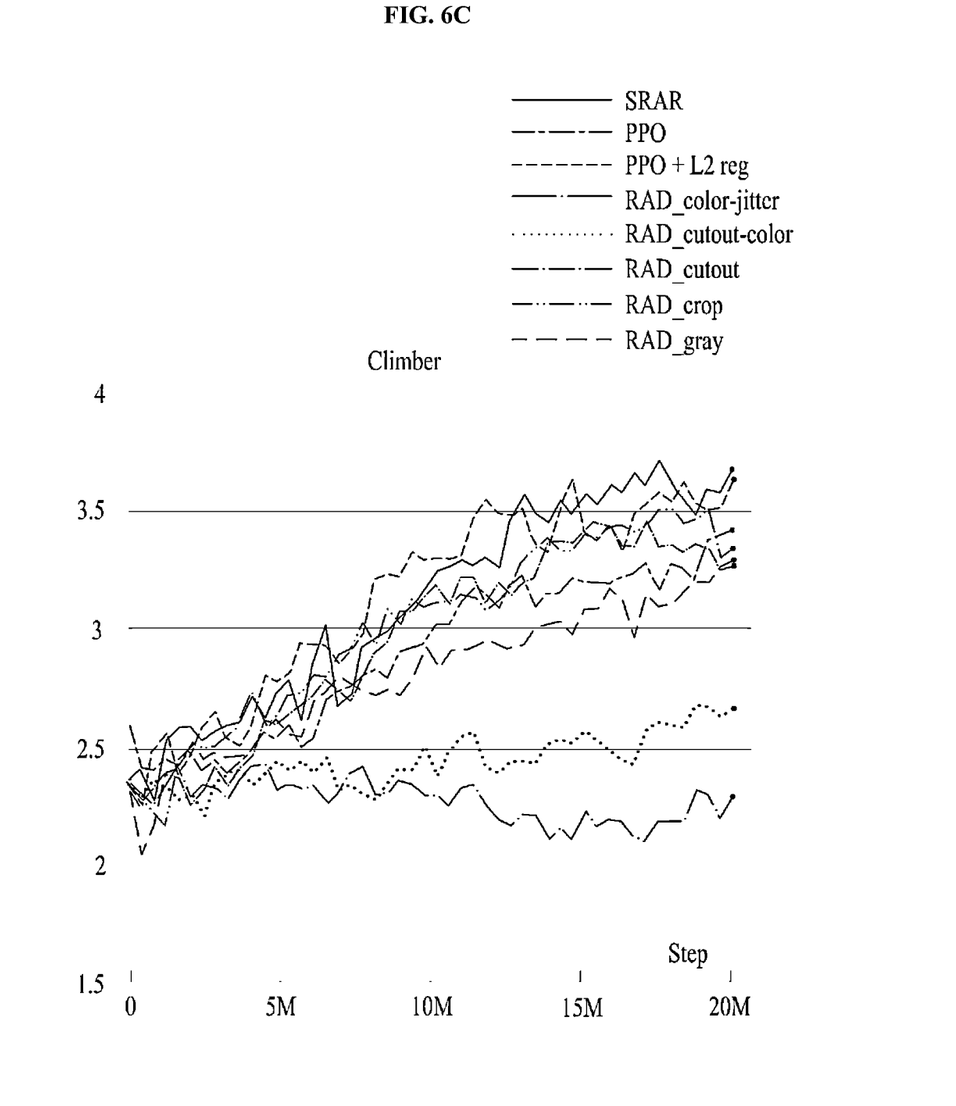
FIG. 6C illustrates an example of performance of a self-supervised RL with analogical reasoning (SRAR) model according to an example embodiment.
Figure 7A:
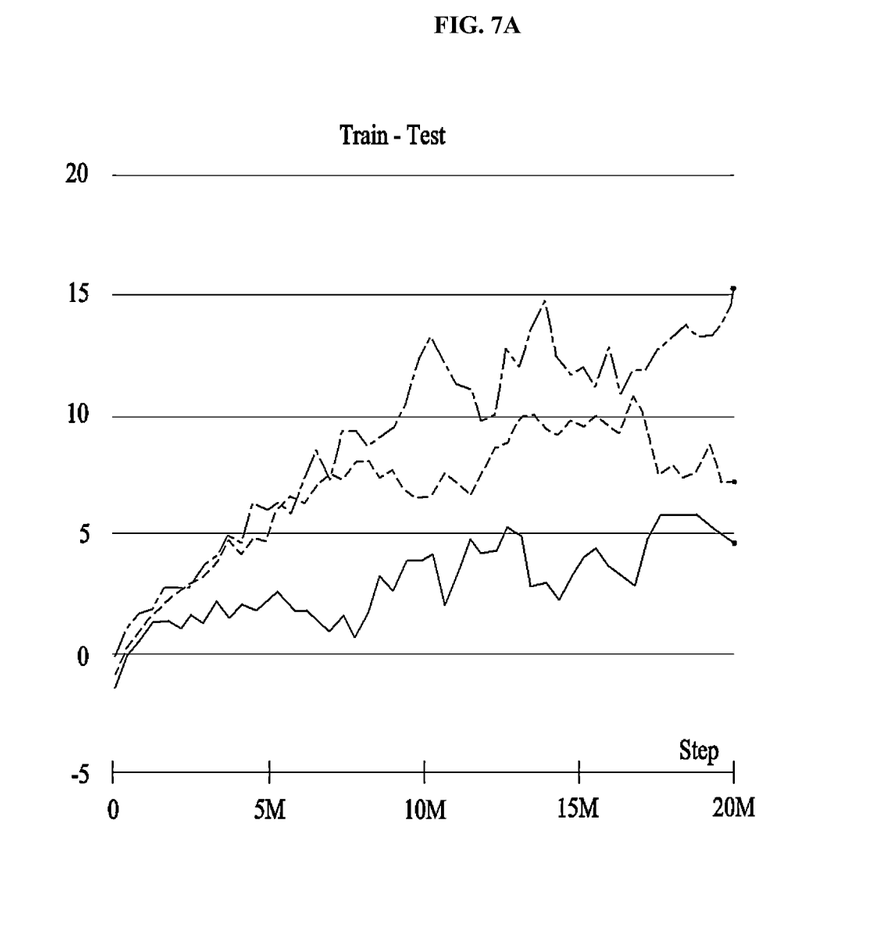
FIG. 7A illustrates an example of performance of a self-supervised RL with analogical reasoning (SRAR) model according to an example embodiment.
Figure 7B:
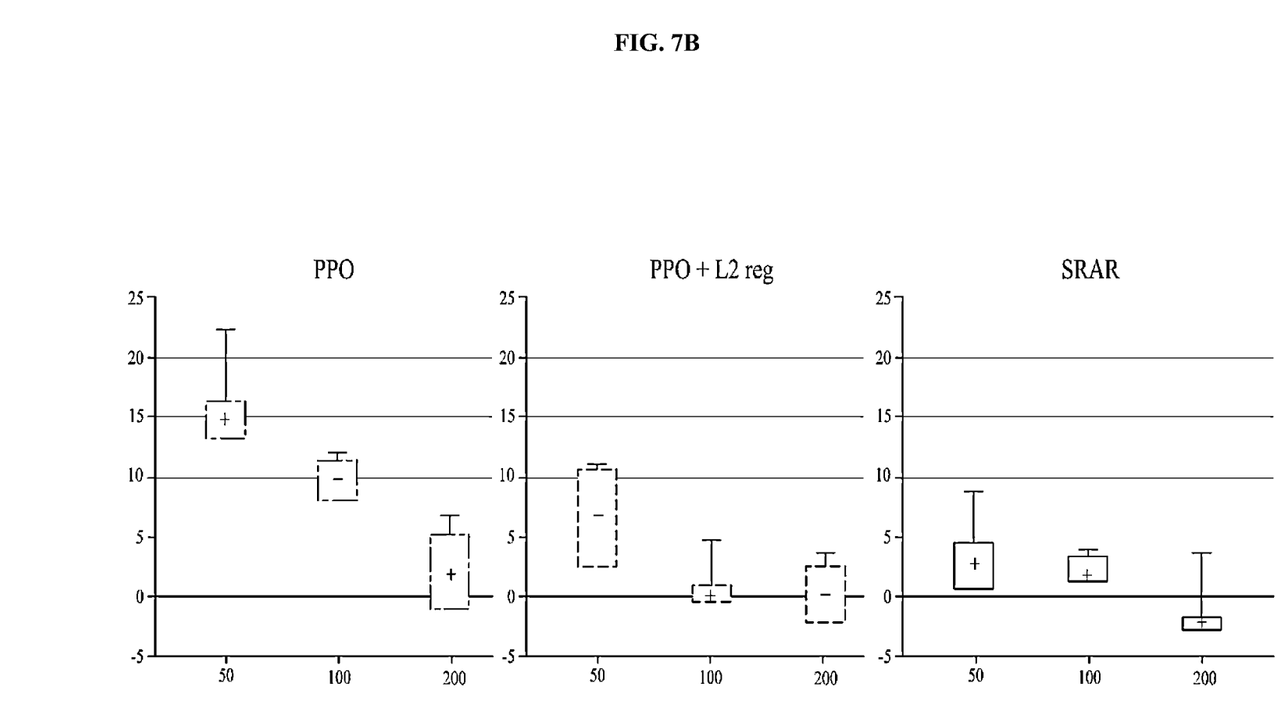
FIG. 7B illustrates an example of performance of a self-supervised RL with analogical reasoning (SRAR) model according to an example embodiment.
Figure 8:
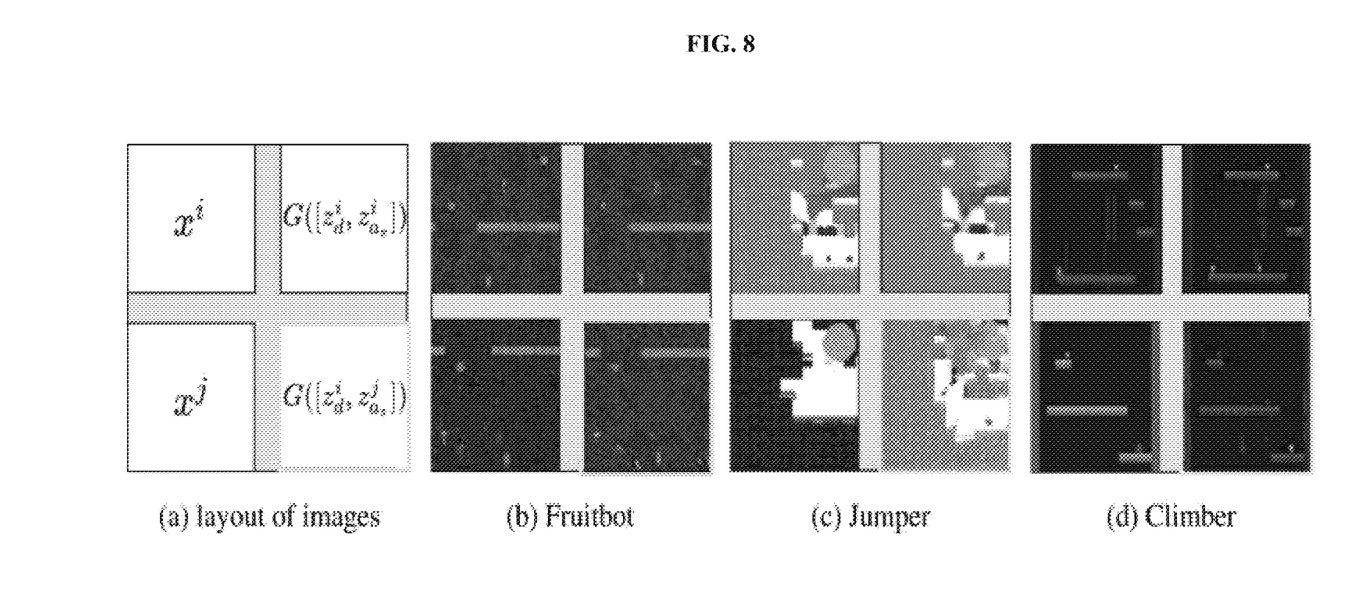
FIG. 8 illustrates an example of performance of a self-supervised RL with analogical reasoning (SRAR) model according to an example embodiment.

FIGS. 6 to 8 illustrate an example of performance of a self-supervised RL with analogical reasoning (SRAR) model according to an example embodiment.

Simulations may be run to show that a SRAR model may improve generalization performance in challenging test scenarios by uncovering true generative factors of a state space in different environments. Evaluations may be conducted using three different methods including: first, test performance compared to other advanced standards; second, a generalization gap between learning and test stages; and third, quality and description probability of a generated image.

ProcGen refers to a unique environment collection designed to measure all of data efficiency and generalization in RL. In ProcGen, training and test environments greatly differ in terms of a visual shape and structure. In an example embodiment, a PPO algorithm may be used to follow environmental settings of ProcGen and to train a policy network. For example, the model may be trained at training levels of 50, 100, and 200, and test performance may be evaluated at randomly selected 1000 unseen levels.

Figure 4:
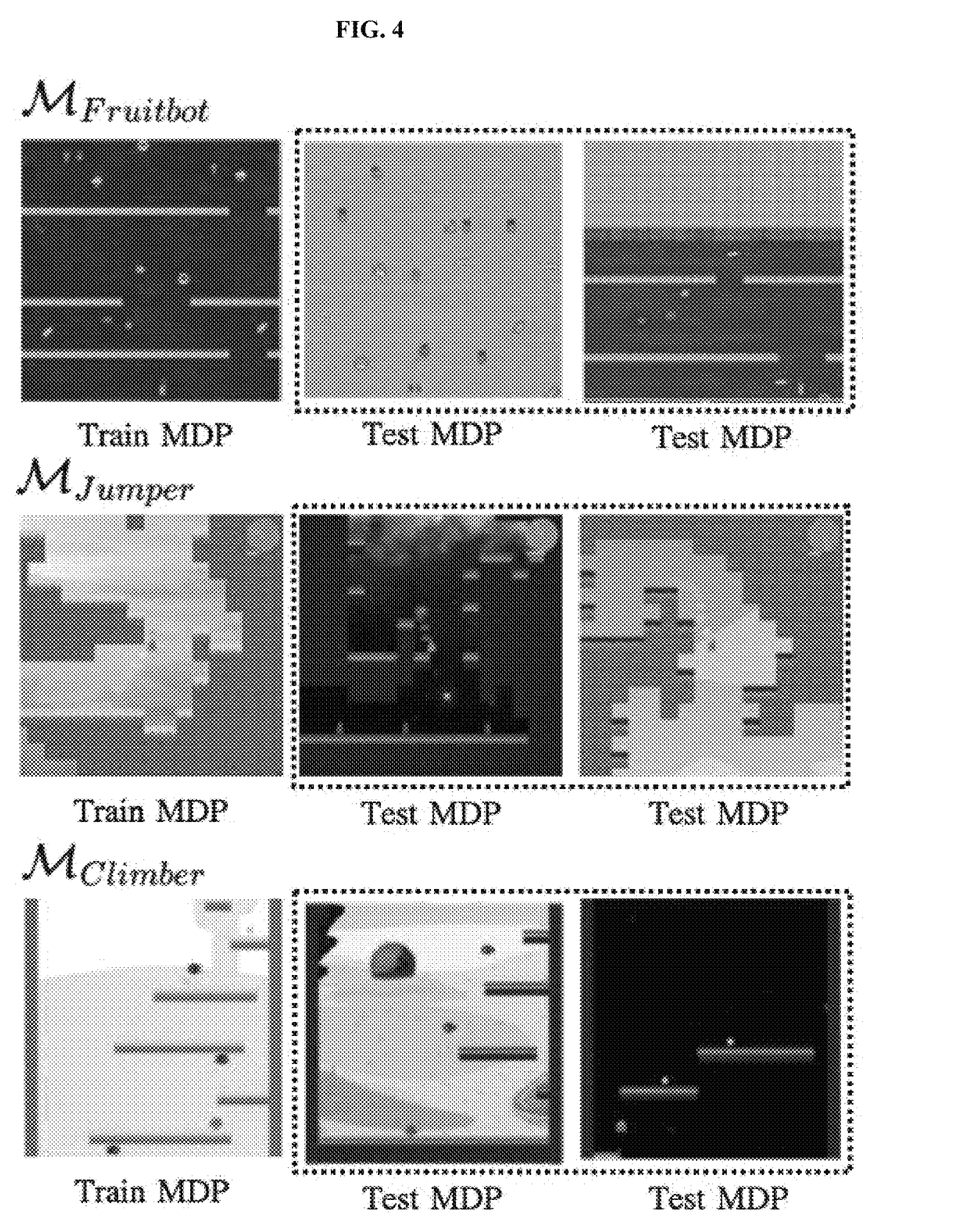
FIG. 4 illustrates an example of a ProcGen benchmark Markov decision process (MDP) training and test according to an example embodiment.

The generalization test may be performed using eight different models, such as the proposed model (SRAR), PPO, PPO+L2 regularization, RAD, and the like. For example, five representative top performance data augmentation techniques (e.g., gray, random crop, cutout, cutout-color, and color-jitter) may be selected and three OpenAI ProcGen environments, Fruitbot, Jumper, and Climber, may be used. FIG. 4 illustrates MDP examples of the respective environments.

Table 1 represents generalization results on ProcGen environments.

TABLE 1

| Environment | # of levels | PPO | PPO + L$_2$ reg | SRAR | RAD (gray) | RAD (crop) | RAD (cutout) | RAD (cutout-color) | RAD (color-jitter) |
|---|---|---|---|---|---|---|---|---|---|
| Fruitbot | 50 | 6.6 ± 1.1 | 10.4 ± 2.5 | 17.3 ± 0.4 | 4.6 ± 2.7 | 4.4 ± 2.5 | 8.1 ± 0.3 | 1.5 ± 1.5 | −1.4 ± 0.9 |
| | 100 | 14.5 ± 2.9 | 16.6 ± 2.3 | 19.6 ± 2.1 | 7.6 ± 2.6 | 11.2 ± 3.8 | 14.7 ± 0.4 | 12.2 ± 3.6 | 5.3 ± 4.5 |
| | 200 | 19.4 ± 1.9 | 21.3 ± 0.6 | 21.3 ± 0.3 | 14.1 ± 0.6 | 16.1 ± 4.7 | 18.5 ± 2.6 | 16.3 ± 7.7 | 19.4 ± 2.9 |
| Jumper | 50 | 4.8 ± 0.2 | 5.3 ± 0.3 | 6.0 ± 0.1 | 5.0 ± 0.2 | 4.0 ± 0.2 | 5.2 ± 0.2 | 4.8 ± 0.4 | 5.6 ± 0.2 |
| | 100 | 5.2 ± 0.5 | 5.8 ± 0.2 | 6.2 ± 0.3 | 5.2 ± 0.1 | 5.1 ± 0.2 | 5.6 ± 0.1 | 5.8 ± 0.6 | 6.1 ± 0.2 |
| | 200 | 6.0 ± 0.2 | 6.3 ± 0 1 | 6.4 ± 0.1 | 5.6 ± 0.1 | 5.2 ± 0.7 | 5.4 ± 0.1 | 5.6 ± 0.4 | 5.9 ± 0.1 |
| Climber | 50 | 3.4 ± 0.2 | 3.6 ± 0.2 | 3.7 ± 0.1 | 3.3 ± 0.1 | 2 7 ± 0.6 | 3.3 ± 0.2 | 2.4 ± 0.5 | 3.4 ± 0.1 |
| | 100 | 4.2 ± 0.3 | 4.4 ± 0.2 | 4.3 ± 0.2 | 3.6 ± 0.1 | 2.8 ± 0.1 | 4.1 ± 0.3 | 2.3 ± 0.1 | 4.0 ± 0.4 |
| | 200 | 4.5 ± 0.1 | 4.9 ± 0.3 | 4.5 ± 0.7 | 4.4 ± 0.3 | 3.2 ± 0.2 | 4.6 ± 0.4 | 2.5 ± 0.2 | 4.2 ± 0.5 |

Generalization results of the proposed model (SRAR) and reference method on three OpenAI ProcGen environments, Fruitbot, Jumper, and Climber, may be presented. Test performance after 20M timesteps may be measured. The results show the mean and standard deviation averaged over three runs using different random seeds.

FIGS. 6A, 6B and 6C illustrate test performance for each time of Fruitbot, Jumper, and Climber using 50 training levels, and FIG. 7 illustrates a generalization gap for each time/training level. (A) of FIG. 7 plots a gap between training and test performance during a training process in the Fruitbot environment using 50 training levels, and (B) of FIG. 7 illustrates an average gap of each model after 20M timesteps over 50, 100, and 200 training levels in the Fruitbot environment.

It can be verified that the proposed model (SRAR) significantly outperforms all the baselines when a training dataset is small. Referring to FIG. 6, it can be verified that this trend appears in an initial stage of training. In particular, it can be verified that the proposed model (SRAR) outperforms all the baselines trained on two times a number of training levels when the training dataset is smallest.

(B) of FIG. 7 illustrates a generalization gap over a size level of a training dataset in the Fruitbot environment. Vanilla PPO shows a significant gap with a small amount of training data and the corresponding gap gradually decreases as a number of training data increases. On the other hand, it can be verified that the proposed model (SRAR) maintains a smallest gap in the entire training process.

For additional description, the generalization gap of the proposed model (SRAR) on 50 training levels is compatible with the generalization gap of PPO using four times more training data. PPO with L2 regularization also shows a relatively small gap, but not as small as the proposed model (SRAR).

In summary, the results show that the RL agent with the proposed model (SRAR) learns task domain-invariant action features due to a hypothetical analogy-making process.

FIG. 8 illustrates examples of images (hybrid images) generated in the respective environments using different latent code combinations. An image generated through the proposed model (SRAR) may be presented around an end of a training process. The results may imply that the proposed model (SRAR) successfully discovered a task domain code and an action code that are generative factors of a state space. The task domain code represents a task level to which a generated image (a hybrid image) belongs and the action code represents action relevant context, such as a structure of walls and placement of fruits in the Fruitbot environment, a direction of a compass needle that points to a location of a carrot in the Jumper environment, and an arrangement of stairs and stars in the Climber environment.

As this result, referring to (c) of FIG. 8, the proposed model (SRAR) may disentangle not only style-relevant or structure-relevant generative factors but also important action-relevant features such as the direction of the compass needle in the Jumper environment.

The example embodiments may apply to various fields. Since it is possible to learn a task domain of given data, to extract an action code irrelevant thereto, and to use the extracted action code to establish a stable action in a situation in which the task domain changes, the example embodiment may actively apply to a field that requires abundant scalability.

In detail, the example embodiments may apply to an autonomous driving field. Learning data for development of an autonomous driving algorithm inevitably accompanies various environmental changes during a collection process. For example, due to weather, time, season, and a camera angle change while driving, data has various task domains. Understanding such various contexts of data is essential for successful autonomous driving. Therefore, according to example embodiments, it is possible to effectively encode various contexts of learning data and to extract task domain-irrelevant and driving-relevant information. Therefore, the example embodiments may be used to develop an autonomous driving algorithm that may flexibly adapt to above environmental changes and ensures stability.

Also, the example embodiments may apply to a health care field. Due to the nature of medical data, the medical data is collected through various medical devices (X-ray, MRI, CT, etc.). Therefore, it is essential to use multi-dimensional data in development of artificial intelligence that helps clinical diagnosis and treatment. However, since the existing artificial intelligence model compressively uses various types of image data, learning is difficult. According to an example embodiment, it is possible to extract only information necessary for decision making of a specialist by encoding task domain information for each medical device. Also, since it is possible to perform efficient learning with high performance even in an environment with a small amount of data, the example embodiments may effectively apply in the health care field in which it is difficult to collect a large amount of learning data due to high shooting cost and the Personal Information Protection Act.

Also, the example embodiments may apply to a metaverse field. To universally use metaverse technology, it is essential to efficiently generate a virtual image for a user in a virtual environment. The example embodiment may be used to generate an image in the virtual environment since it is based on a model that generates a realistic virtual image by variously combining action information and task domain information encoded through learning data. For example, since it is possible to generate a new virtual image required for driving after learning the autonomous driving algorithm, the example embodiment may be used in a driving training or a driving situation in the metaverse using a relevant image.

A decision error in the autonomous driving field or the healthcare field is highly likely to lead to human loss. Therefore, it is more important than any other business fields to reduce errors in responding to situations that are seen for the first time. According to an example embodiment, since it is possible to effectively separate policy information and to achieve high adaptability to a context seen for the first time, the example embodiment may be used to increase stability of an artificial intelligence algorithm in the related industrial field.

The systems and/or apparatuses described herein may be implemented using hardware components, software components, and/or a combination thereof. For example, apparatuses and components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. Also, the media may include, alone or in combination with the program instructions, data files, data structures, and the like. Program instructions stored in the media may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for self-supervised reinforcement learning (RL) by analogy executed by a computer device, comprising:
configuring a self-supervised RL with analogical reasoning (SRAR) model; and
learning a policy for problem solving in a situation in which a task domain changes using the configured SRAR model,
wherein the learning comprises inputting each original image to a convolution-based encoder, and separating a task domain code and an action code from the each original image through the convolution-based encoder.

2. The method of claim 1, wherein the SRAR model is trained such that a reinforcement learning (RL) agent performing an analogy-making procedure when adopting an action for problem solving achieves an objective of the policy.

3. The method of claim 2, wherein the SRAR model is configured to perform analogy-making through a mutual information (MI) regularized generative adversarial network (GAN) structure.

4. The method of claim 3, wherein the SRAR model is configured to generate a hybrid image by training an encoder, a generator, and a discriminator, and simultaneously to maintain MI between the hybrid image and labels of original images.

5. The method of claim 4, wherein the learning comprises learning the policy using a proximal policy optimization (PPO) algorithm for the hybrid image to train a RL agent.

6. The method of claim 2, wherein the RL agent is configured to learn a generalizable policy using task domain-invariant action code.

7. The method of claim 1, wherein the learning comprises inputting a task domain code of one original image and an action code of another original image based on the task domain code and the action code separated from the each original image to a generator, and generating a combined hybrid image through the generator.

8. The method of claim 7, wherein the learning comprises evaluating a realistic level of the generated hybrid image by comparing the generated hybrid image and an original image that refers to the task domain code through a discriminator.

9. The method of claim 8, wherein the learning comprises inputting the generated hybrid image to each of a basic discriminator, a style discriminator, and an action predictor.

10. The method of claim 9, wherein the basic discriminator is configured to help a realistic image generation in the hybrid image.

11. The method of claim 9, wherein the style discriminator is configured to output a realistic level of a task domain-relevant style by comparing the generated hybrid image and the original image that refers to the task domain code.

12. The method of claim 9, wherein the action predictor is configured to output an action distribution given to the generated hybrid image, and to minimize a Kullback-Leibler (KL) divergence between the output action distribution and an original action distribution of an original image that refers to the action code.

13. A non-transitory computer-readable recording medium storing instructions that, when executed by a processor, cause the processor to perform the method of claim 1.

14. A computer device, comprising:
a model constructor configured to configure a self-supervised RL with analogical reasoning (SRAR) model; and
a policy learner configured to learn a policy for problem solving in a situation in which a task domain changes using the configured SRAR model,
wherein the policy learner is configured to input each original image to a convolution-based encoder, to separate a task domain code and an action code from the each original image through the convolution-based encoder, to input a task domain code of one original image and an action code of another original image based on the task domain code and the action code separated from the each original image to a generator, and to generate a combined hybrid image through the generator.

15. The computer device of claim 14, wherein the SRAR model is trained such that a reinforcement learning (RL) agent performing an analogy-making procedure when adopting an action for problem solving achieves an objective of the policy.

16. The computer device of claim 15, wherein the SRAR model is configured to perform analogy-making through a mutual information (MI) regularized generative adversarial network (GAN) structure, to generate a hybrid image by training an encoder, a generator, and a discriminator, and simultaneously to maintain MI between the hybrid image and labels of original images.

17. The computer device of claim 14, wherein the policy learner is configured to evaluate a realistic level of the generated hybrid image by comparing the generated hybrid image and an original image that refers to the task domain code through a discriminator.

18. The computer device of claim 17, wherein the policy learner is configured to input the generated hybrid image to each of a basic discriminator, a style discriminator, and an action predictor, to help a realistic image generation in the hybrid image through the basic discriminator, to output a realistic level of a task domain-relevant style by comparing the generated hybrid image and the original image that refers to the task domain code through the style discriminator, and to output an action distribution given to the generated hybrid image and to minimize a Kullback-Leibler (KL) divergence between the output action distribution and original action distribution of an original image that refers to the action code through the action predictor.

* * * * *